(12) United States Patent
Dix et al.

(10) Patent No.: US 7,042,333 B2
(45) Date of Patent: May 9, 2006

(54) CENTRAL ACCESS CONTROL SYSTEM

(75) Inventors: Peter J. Dix, Naperville, IL (US); Marius Bojarski, Bolingbrook, IL (US)

(73) Assignee: CNH America LLC, New Holland, PA (US)

( * ) Notice: Subject to any disclaimer, the term of this patent is extended or adjusted under 35 U.S.C. 154(b) by 271 days.

(21) Appl. No.: 10/712,160

(22) Filed: Nov. 12, 2003

(65) Prior Publication Data

US 2005/0099265 A1   May 12, 2005

(51) Int. Cl.
H04Q 9/00 (2006.01)
(52) U.S. Cl. .......................... 340/5.72; 705/5; 455/88
(58) Field of Classification Search ............... 340/5.72, 340/5.21, 10.1; 705/5; 455/88
See application file for complete search history.

(56) References Cited

U.S. PATENT DOCUMENTS

| | | | |
|---|---|---|---|
| 4,852,680 A | 8/1989 | Brown et al. | |
| 5,369,581 A | 11/1994 | Ohsuga et al. | 701/48 |
| 5,508,694 A | 4/1996 | Treharne et al. | |
| 5,528,843 A | 6/1996 | Rocke | |
| 5,610,574 A | 3/1997 | Mutoh et al. | |
| 5,745,026 A | 4/1998 | Kokubu et al. | |
| 5,808,372 A | 9/1998 | Schwegler et al. | 340/5.64 |
| 5,815,071 A | 9/1998 | Doyle | |
| 5,886,421 A | 3/1999 | Mizuno et al. | |
| 5,969,633 A | 10/1999 | Rosler | |
| 6,025,653 A | 2/2000 | Hayashi et al. | |
| 6,144,113 A | 11/2000 | Hayashi et al. | |
| 6,154,694 A | 11/2000 | Aoki et al. | |
| 6,225,890 B1 | 5/2001 | Murphy | |
| 6,269,292 B1 | 7/2001 | Kokubu et al. | |
| 6,380,842 B1 | 4/2002 | Mattes et al. | |
| 6,430,488 B1 | 8/2002 | Goldman et al. | 701/36 |
| 6,480,117 B1 | 11/2002 | Flick | |
| 6,501,369 B1 * | 12/2002 | Treharne | 340/5.22 |
| 6,522,251 B1 | 2/2003 | Menne et al. | |
| 6,538,557 B1 | 3/2003 | Giessl | |
| 6,552,648 B1 | 4/2003 | Rick et al. | |
| 2002/0019689 A1 | 2/2002 | Harrison et al. | |
| 2002/0084887 A1 | 7/2002 | Arshad et al. | |

* cited by examiner

Primary Examiner—Michael Horabik
Assistant Examiner—Matsuichiro Shimizu
(74) Attorney, Agent, or Firm—John William Stader; Stephen A. Bucchianeri; Michael G. Harms

(57) ABSTRACT

An access control system for work vehicles has a display, an operator input device and a computer configured to program individual vehicles keys to operate individual vehicles or groups of vehicles.

15 Claims, 6 Drawing Sheets

CENTRAL ACCESS CONTROL SYSTEM

FIELD OF THE INVENTION

This invention relates to an access control systems for a fleet of work vehicles. More particularly, it relates to an access control system that selectively controls access to work vehicles in a fleet based upon the electronic configuration of an access device and the vehicle itself.

BACKGROUND OF THE INVENTION

Access to motor vehicles has been limited by using various control systems over the years. Originally, internal combustion vehicles were accessed merely by turning on a manual switch and manually cranking (i.e. turning over) the vehicle's engine. As time passed, electric starters and key lock switches connected to the starters were added to further limit access and control unauthorized use.

The traditional automotive access control paradigm is familiar to most people. In this paradigm, automobiles are limited to use by a single user or a small group of users, all of whom have identical keys or share a single key to operate the vehicle. In this paradigm, each automobile is associated with a unique key that can only be used to operate one automobile. If an operator has three cars, he needs three different keys, one key for each auto.

The same is not true for most work vehicles, however. In the construction and agricultural industry, there historically has been more concern about easy and quick access and less concern about theft. There is less risk of theft in the construction and agricultural industries, compared with autos, but the numbers are increasing.

For work vehicles, the biggest vehicle access problem has not been theft or misuse by trained operators, but misuse by untrained joy riders. A simple solution to deter joy riders would be to use a key unique to each vehicle. But having individual key locks on the different vehicles on a job site would be impractical since many workers typically use a variety of vehicles during the day. Furthermore, most work vehicles are part of large fleets of work vehicles that are commonly owned by construction companies and are kept at various work sites for extended periods of time, often being used for two or three shifts a day. There are new operators for the work vehicles with every shift change. Also the vehicles may be replaced when one vehicle is transferred to another work site or back to the fleet site for maintenance.

Thus each manufacturer developed a standard ignition lock. In this system, which prevails today, most manufacturers use a preferred ignition lock for every vehicle they make. From the fleet operator's perspective, a common lock significantly simplifies vehicle access control. If a worksite has backhoes, front loaders, skid steer loaders and other vehicles all made by a single manufacturer, all the operators only need a single key to operate all the vehicles. This single key will be the same for all the vehicles made by that manufacturer, no matter when or where the vehicle was added to the fleet.

This is a minimally effective access control system. The industry is comfortable with it since it deters most untrained and unauthorized drivers from accessing the vehicle, yet permits a skilled and authorized operator to easily access any vehicle with his personal key.

This system is the dominant access control paradigm for the construction industry and affects daily operations in the construction industry. Such operations relate to how vehicles are stored, how operators are assigned to operate individual vehicles, and how operators move from one vehicle to another during the workday. Single key operation of different vehicles of one manufacturer is now embedded in the construction industry. It would be shortsighted if not impossible to replace it now with the automotive single-key-per-vehicle paradigm. Nor would a single-key-per-vehicle system meet the needs of the construction industry.

The construction industry continues to change and a need for better vehicle access control has arisen. First, many companies now rent or lease their work vehicles. The owner of the rented or leased vehicle is not at the work site to monitor their usage, make sure they are serviced properly, make sure they are not misused, and make sure they are not used outside the terms of the vehicle lease or rental contract. For the owners of these vehicles, it is important to have vehicle access control features.

The single-key-per-vehicle automotive access control paradigm is not viable due to the many keys that every operator must have, the chance for loss, and the need for a locksmith to replace the key or lock whenever a key is lost. Furthermore, there are more keys to lose. Thus, if one key is lost, the vehicle's lock must be re-keyed and replacement keys provided for every key holder.

Thus, a system for controlling access to a fleet of vehicles, particularly construction vehicles, that has the flexibility of the single-key-per-manufacturer system and much of the security of the single-key-per-vehicle system is needed. It is therefore an object of the present invention to provide such capability.

SUMMARY OF THE INVENTION

In accordance with a first embodiment of the invention, an access control system is provided that includes a stationary computer system and a plurality of vehicles, the stationary computer being configured to electronically configure individual keys to access the vehicles thereby selectively permitting a first key to operate several vehicles and several keys to operate a single vehicle.

In accordance with another embodiment, a plurality of vehicles are provided that are operable by keys programmed at a stationary computer system. Individual ones of these keys have been programmed to operate more than one vehicle and individual vehicles have been programmed to be operated by more than one of these keys.

In accordance with another embodiment of the invention, a stationary computer is provided that is programmed to configure individual keys such that each of the individual keys can operate several vehicles of a fleet, and to configure several of the individual keys to operate a single vehicle.

DETAILED DESCRIPTION OF THE PREFERRED EMBODIMENT

Figure 1:
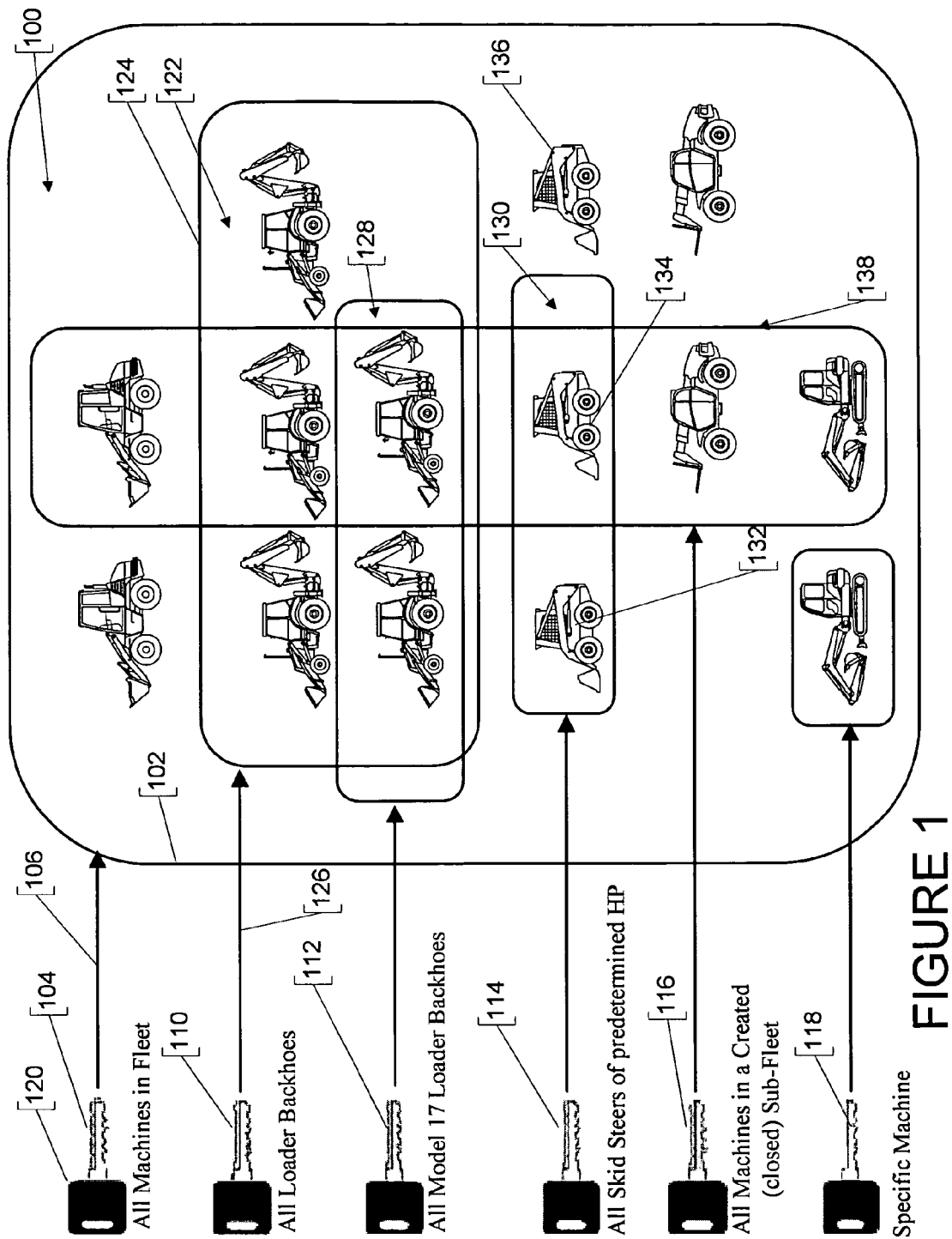
FIG. 1 illustrates a fleet of vehicles that are organized in sub-fleets, each of the sub-fleets cooperating with an operator key shown in the right-hand column so as to provide a vehicle operator with access to the vehicle.

FIG. 1 illustrates a fleet of vehicles 100 that is managed by the access control system of the present invention. In FIG. 1, the entire fleet 100 of work vehicles is shown inside a first border 102. Every vehicle in this fleet may initially be configured to be accessed (or started) by one operator key 104 that is shown graphically connected to the fleet by lead line 106.

In general, operator key 104 is identical to all the other operator keys 110, 112, 114, 116, and 118. All of the keys are configured to engage corresponding elements in the ignition switch lock of the vehicles illustrated in FIG. 1. The elements of the switch lock are unlocked by the key to actuate the ignition switch. Key 104 is configured to operate all of the ignition switch locks of all the vehicles in the fleet 100. Thus the ignition switch locks of every vehicle in the fleet can be operated by one key 104.

Operator key 104 is similar to the other keys 110, 112, 114, 116, 118 in another respect. Each key includes an electronic communication and memory circuit 120 that is configured to communicate digital data with all the vehicles and with the access control system. In the preferred embodiment, the electronic communications and memory circuit 120 is an RFID device, preferably a small RFID tag. Alternatively, the circuit 120 could be another electronic circuit that communicates and receives digital values with the vehicle control system. Circuit 120 includes a transmitter, or a radio transmitter and receiver, or an electrical circuit for direct electrical contact from the key to the vehicle control system.

There are several sub-fleets within the fleet 100. A "sub-fleet" is a sub-set of the vehicles in the fleet, the sub-set having fewer than all the vehicles in the fleet.

The first illustrated sub-fleet is the loader-backhoe sub-fleet 122. Loader-backhoe sub-fleet 122 includes all the loader backhoes in the fleet and excludes all other work vehicles in the fleet, as indicated by second border 124. It is operable by key 110 as indicated by lead line 126.

The second sub-fleet 128 includes Model A loader-backhoes. "Model A" is a symbolic reference to a manufacturer's model number or identifier for a vehicle. Typically, a manufacturer has several model numbers for different versions of a class of vehicles, such as loader-backhoes. For convenience of illustration, "Model A" is a specific example of one possible model identifier.

Sub-fleet 128 of Model A loader-backhoes is completely contained within the larger sub-fleet 122 of all vehicles of the type "loader-backhoe". Sub-fleet 128 is a subset of sub-fleet 122, which, in turn, is a subset of fleet 100.

A third identified sub-fleet is the sub-fleet 130 of skid-steer loaders having a predetermined horsepower. This sub-fleet includes two skid-steer loaders, 132 and 134, of the three skid-steer loaders shown in fleet 100. The third skid-steer loader 136 is not included in sub-fleet 130 since, for example, its horsepower falls outside the predetermined horsepower threshold for inclusion in sub-fleet 130. Of course, a sub-fleet may be configured to include vehicles with horsepower ratings above a predetermined minimum horsepower, below a predetermined maximum horsepower, or within a particular range of horsepower ratings.

A fourth identified sub-fleet is custom sub-fleet 138 that has several different types of vehicles. For example, this sub-fleet may include only vehicles licensed in a particular state. Note that this sub-fleet includes several vehicles that belong to other sub-fleets. For example, skid-steer loader 134 belongs to one other sub-fleet. Loader-backhoe 140 belongs to two other sub-fleets.

To create a sub-fleet, it is necessary to program at least one key to cooperate with a particular set of vehicles. The programming of the keys and the correspondence of that programming with values preprogrammed in each vehicle that define the fleet will be described below.

When the key is inserted into an ignition switch lock, a set of digital values identifying the vehicles the key will operate and communicate the key into a digital electronic controller in the work vehicle. These values are examined by one of the vehicle's digital electronic controllers, which determines whether the vehicle will start using that key.

Figure 2:
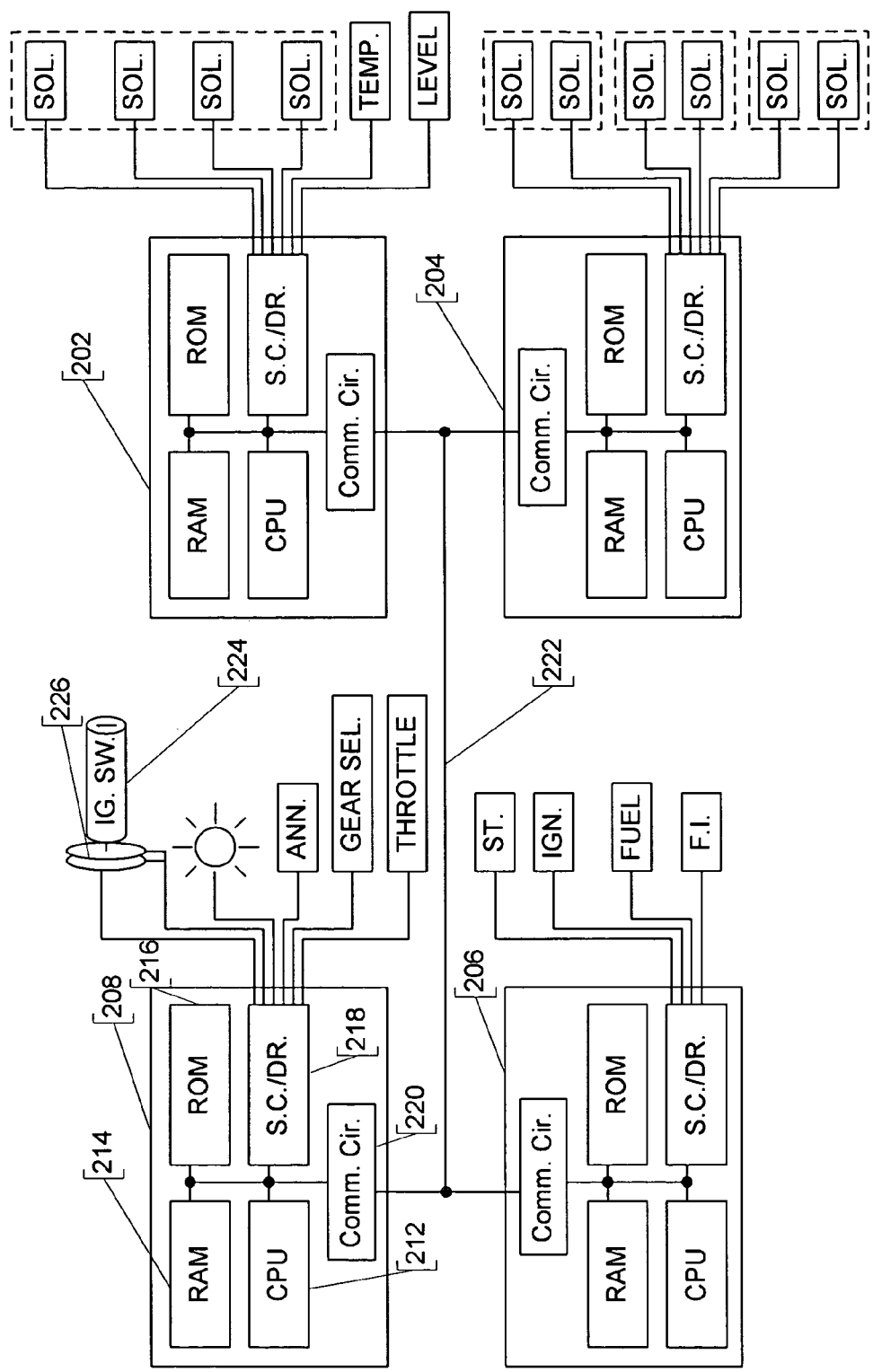
FIG. 2 illustrates a vehicle control system for each vehicle in a fleet, the control system of each vehicle being configured to receive an operator key and selectively provide access to the vehicle based upon data received from the operator key.

FIG. 2 illustrates a vehicle control system that includes several digital electronic controllers 202, 204, 206, 208 that together comprise the vehicle controller network. There are four digital electronic controllers illustrated in FIG. 2: a transmission controller 202, an auxiliary hydraulics controller 204, an engine controller 206, and an operating controller 208 that is coupled to the manual operator controls manipulated by the vehicle operator to make the vehicle function.

Each digital electronic controller 202, 204, 206, 208 includes a CPU 212, random access memory 214, read-only memory 216, a signal conditioning and driving circuit 218, and a communication circuit 220 that are all coupled together by means of a high-speed computer bus 222, preferably a serial bus, and more preferably an SAE J-1939 CAN bus. Each controller has a program and data stored in its ROM that controls the operation of that controller. Since the type and function of the vehicles in fleet 100 vary, controllers on different vehicles may have a different array of devices coupled to the signal conditioning and driving circuits 218 of each controller.

For each vehicle in the fleet, the signal conditioning and driver circuit 218 of controller 208 is coupled to an ignition switch lock 224. A vehicle operator activates the ignition switch by inserting his key in the ignition switch lock. CPU 212 receives the signal from the ignition switch 224 via signal conditioning and driving circuit 218 and responds in an appropriate programmed manner. In the preferred configuration, all of the ignition switch locks of all of the vehicles in fleet 100 are operable by each and every key 104, 110, 112, 114, 116, and 118.

Controller 208 is also coupled to a key reading and writing device such as coil 226 that is arranged adjacent to (and preferably around) ignition switch 224. This coil 226 is selectively actuated by circuit 218, and by electromagnetic coupling drives the communications circuit 120 of the key inserted in the ignition switch lock. This coil, when electrically activated, functions to energize the communications circuit 120 in the key. In response, the communications circuit 120 sends a signal to the coil 226 and then to controller 208, which examines it.

The electrical signal sent to controller 208 includes digital values that were pre-programmed in the communication circuit of the key. These values tell controller 208 that the key is authorized (or is not authorized) for use with that vehicle.

One vehicle operator can travel to all the remote vehicles in the fleet, insert his operator key into each ignition switch and start each vehicle. The vehicles that respond by operating are those having a digital controller containing digital values (or numbers) that properly correspond with digital values stored in communications circuit 120 of the key. The vehicles will operate only if one or more digital values of the operator key correspond to one or more corresponding values stored in electronic memory 214 or 216 of that digital controller. In the preferred embodiment, these values are stored in the memory of controller 208. The controller 208 compares the digital value received from the operator key with digital value or values that it stored in its memory. If the values correspond in a predetermined manner, controller 208 responds by letting the vehicle operator start and operate the vehicle.

The operator keys are programmed by the access control workstation 300 located remotely from the vehicles in the fleet. By locating the access control workstation 300 remotely from the vehicle, keys can be quickly and easily programmed at a single location to operate a sub-fleet of vehicles that are widely separated in distance. There is no need to visit each vehicle and teach each vehicle to recognize the new key.

The access control workstation 300 is typically located in the office of the fleet manager. The access control workstation 300 preferably includes a computer 302 connected to a combined key reader and writer 312 that is configured to electronically reprogram or reconfigure any key inserted therein.

Figure 3:
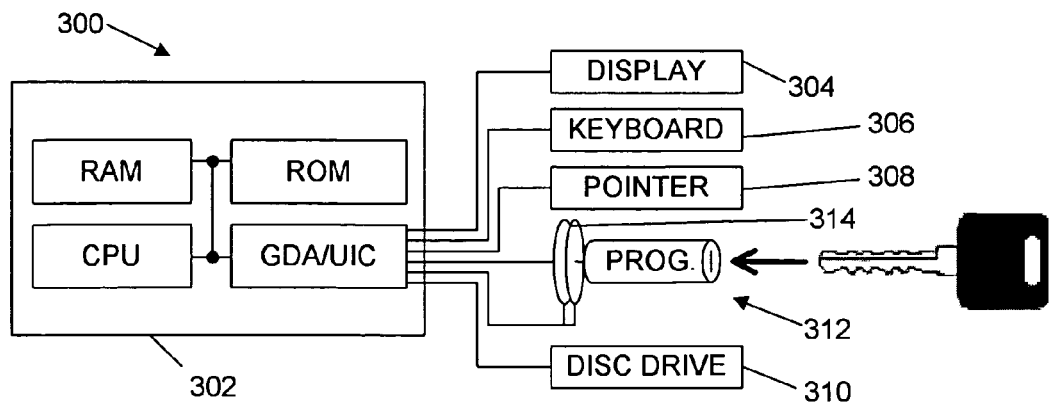
FIG. 3 a schematic diagram of an access control workstation that electronically configures the operator key of FIG. 1 to grant or deny vehicle access.

FIG. 3 illustrates a preferred access control workstation 300 for programming operator keys. It includes an access control computer 302, which in turn includes RAM, ROM, a CPU, an output means such as a graphics display adapter coupled to a computer visual display 304 and an input means such as a user interface circuit coupled to keyboard 306 and mouse 308. Computer 302 is preferably a general-purpose personal computer, although it may be a specially configured digital microprocessor-based device. A disk drive 310 and a read and write mechanism 312 are coupled to computer 302. The read and write mechanism 312 includes a coil 314 that energizes the communications circuit 120 in the operator key when the coil 314 is activated by computer 302. Coil 314, when activated, is also configured to receive signals transmitted by communications circuit 120, such as the digital values stored in the operator key. In this manner, access control computer 302 of workstation 300 operates coil 314 to read digital values previously stored in the operator keys and write digital values into the operator keys. The coil 314 and its associated circuitry function as a reader and a writer for the inserted keys. Other key reading and writing mechanisms and circuits may also be employed as key readers and key writers, such as a circuit that directly couples the communications circuit 120 directly to computer 302 rather than by communicating with each key by a coil-generated electromagnetic field.

When the fleet manager inserts an operator key into the key reader and writer 312, the computer generates an electrical signal in the coil 314 that is strong enough to energize the communication circuit 120 in the key and cause it to transmit the digital values in the key to the computer 302 via coil 314. In this manner, the computer 302 can query the key and determine its configuration (i.e. determine the digital values stored therein). Computer 302 is also configured to read the configuration of the key, compare it with stored parameters in ROM of computer 302 indicating the different key configurations, and signal the display 304 to display this information. This feature is useful when an operator key is returned and a fleet manager wishes to find out who owns the key or what vehicles the key is configured to operate.

Figure 7:
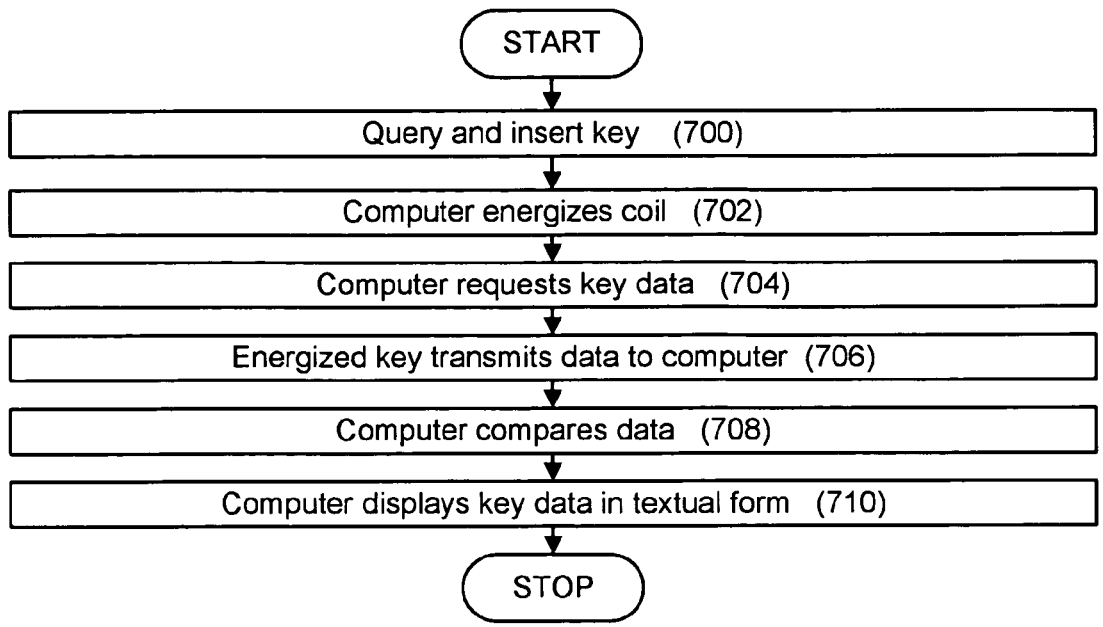
FIG. 7 is a flow chart illustrating the process by which the access control workstation queries a key to determine how the key is configured and display the configuration for review.

Access control workstation 300 is configured to perform this operation as shown in FIG. 7. Referring now to FIG. 7, the access control workstation operator (such as a fleet manager) first inserts an unknown operator key into the key reader and writer and selects a query mode of computer 302 operation (700). With the key inserted, computer 302 signals output device 304 to display "key query". Using an input device coupled to computer 302, such as keyboard 306 or mouse 308, the fleet manager selects the legend "key query". Coil magnetic field (702) energizes the communications circuit of the key and requests the key data (704), causing the key to transmit its current configuration (i.e. its stored numeric values) to computer 302 (706). Having received these values, computer 302 compares them with values previously stored in the ROM of computer 302 (dicate the key values (710)).

For example, an operator key may have a communication circuit 120 that stores a unique ID number (e.g. 4236) that indicates it is assigned to or otherwise associated with a particular operator (e.g. Joe Smith) wherein this ID number is one of the one or more digital numeric values stored within the communications circuit 120. The communications circuit 120 of the key may also store a second number (e.g. 7884) that allows the key to operate wheel-loaders. Circuit 120 may store a third number (e.g. 9521) that allows the key to operate any vehicle of 40 horsepower or less. When the key is inserted into the key reader and writer, computer 302 reads the numbers (4236, 7884, and 9521), compares those numbers with corresponding numbers in its memory and displays "Joe Smith" as the key owner or proper key user on display 304. It also displays "wheel-loaders" and "HP over 40" as the type of vehicles the key is configured to operate on display 304. Note that there are two fleets (front/loaders and vehicles of 40 HP or less) that the key is configured to operate, and that identifiers of both of these sub-fleets are provided on display 304.

Computer 302 is capable of doing this since it stores digital values that correspond to the numbers (4236, 7884, and 9521 in this example) that are stored in the operator key. These stored numbers are maintained in a data structure in computer 302 that associates them with the text strings "Joe Smith" (i.e. the name of the key owner), "wheel-loaders" (i.e. the type of vehicle the owner is permitted to operate, and also the text that indicates the first sub-fleet the key is permitted to operate), and "HP less than 40" (i.e. the second type of vehicle the key owner is permitted to operate, and also the text indicating the nature of that second sub-fleet).

In this manner, computer 302 retrieves data (alphanumeric data, in this case) indicative of the operator key user and a plurality of sub-fleets that the operator key (and hence the operator associated therewith) is permitted to operate and displays that data on a computer display screen.

Computer 302 is also programmed to write digital numeric values into the communications circuit 120 of the key that indicate the proper key user and the sub-fleets the key user are permitted to operate.

Figure 4:
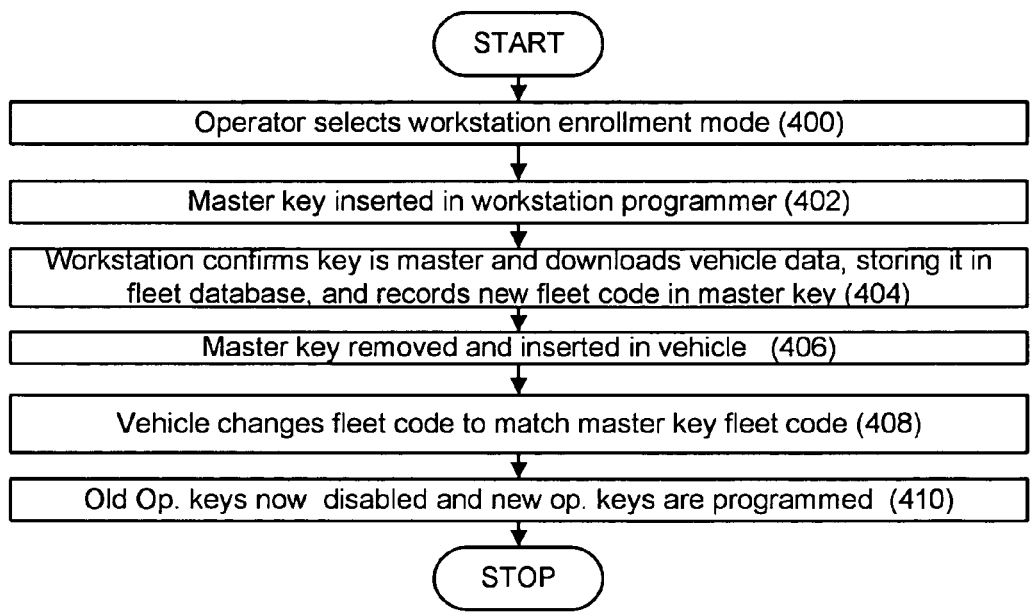
FIG. 4 is a flow chart illustrating the process by which the access control workstation enrolls a new vehicle in the access control system.

To display information about the vehicle that is stored on the key or to program a key to operate a vehicle, the vehicle must first be identified as a vehicle in the fleet that is managed using workstation 300. This process of identifying or associating a vehicle with a fleet is called "enrollment", and the process of enrollment is illustrated in FIG. 4.

Before we describe the process of enrollment (FIG. 4), however, a little more explanation of computer 302 and the vehicles is in order.

Each vehicle stores in ROM or RAM memory of at least one of its electronic controllers 202, 204, 206, or 208, a digital vehicle identification number that uniquely identifies that vehicle. This number may be saved in the electronic memory of a vehicle controller as a single number, or as multiple numbers that may be combined in a predetermined fashion to generate a unique identifier for that vehicle.

The discussion above pertains largely to operator keys, those keys used to start and run a vehicle—to provide access to it. There is another class of keys that can be inserted into the vehicles' ignition switch locks called a "master key". Each vehicle also has an associated master key. The master key for a vehicle stores the digital vehicle identification number or a number bearing a predetermined relationship thereto.

Both the master key and at least one electronic controller of the key's associated vehicle also store several other digital numbers that indicate physical characteristics of the vehicle, such as its horsepower, its general vehicle type (crawler excavator, wheeled excavator, skid steer loader, agricultural tractor, combine, bulldozer, telehandler, semitractor, wheel loader, harvester, cotton picker, road grader, loader-backhoe, etc.), its size, its configuration, its dimensions, and its power source (diesel, electric, pneumatic, or gasoline motors, etc.).

Both the master key and at least one electronic controller of the key's associated vehicle also store digital numbers that indicate other vehicle characteristics such as the manufacturer's model number assigned to the vehicle and its serial number. The manufacturer of the vehicle will typically provide the purchaser of the vehicle with the master key just as vehicle manufacturers now provide ignition keys to purchasers.

As in the previous paragraph, the numbers identifying these characteristics stored in the communications circuit of the master key need not be identical to the numbers for the same characteristics stored in the vehicle, but they bear a predetermined relationship thereto.

The master key is similar to the operator key in most respects. It will also engage the ignition lock of all the vehicles in the fleet and has a communications circuit 120 that communicates with the vehicle and with workstation 300 in the same manner as the operator's keys. The master key is recognizable by computer 302 as different from the operator's keys that start and operate the vehicle.

The reason the master and operator keys are different is to provide additional security for the vehicles in the fleet. If a regular operator's key could be used like a master key, someone with an operator key could use that key to enroll the vehicle in another fleet (e.g. by inserting their operator key in another fleet's computer 302 and enrolling it in that fleet).

This difference can be mechanical, such as a different mechanical indentation or protrusion that engages the key reader and writer of the vehicle and of the workstation 300 in a unique manner, or (more preferably) it is an electrical difference. By "electrical" we mean that the master key generates a slightly different electrical signal when stimulated by the coil of the key reader and writer. A preferred electrical difference between the master key and an operator's key for the same vehicle is preferably a difference of one or more numbers stored within the communications circuit 120 of the master key that cause the master key to generate one or more different numbers when communicating with computer 302. It is the difference in transmitted numbers that indicate to computer 302 that the key in the key reader and writer is a master key.

Computer 302 is configured to require the insertion of a vehicle's master key before it will enroll that vehicle in the fleet managed by that computer 302. Once enrolled, computer 302 can take charge of the vehicle, assign it to sub-fleets and make operator keys for it. Without a master key and enrollment, computer 302 cannot do so.

Referring now to FIG. 4, enrollment begins when the operator of computer 302 selects the enrollment mode of operation (400) by using the keyboard or the mouse. Once the enrollment mode of operation is selected, the operator inserts the master key for the vehicle to be enrolled into the key reader and writer (402). Computer 302 energizes coils in the key reader and writer. The coils, in turn, energize the communication circuit in the master key, which downloads the key's internally stored numbers. Computer 302 determines that the key is a master key preferably by downloading a number or numbers stored in the master key that indicate it is a master key and comparing them with a predetermined number in the memory of computer 302 (404). Based on this comparison, computer 302 determines that the key is a master key. If it is not a master key, the process of enrollment stops.

Once computer 302 determines the key is a master, it downloads additional numbers from the key's communications circuit. These numbers, described above, identify vehicle characteristics. Numeric values indicative of these characteristics are stored in the memory of computer 302 for later use.

At the same time, computer 302 transmits a fleet code to the master key, which records the fleet code in the communications circuit (404). This fleet code is a numeric value that identifies the fleet to which the vehicle will belong—the fleet that is managed by computer 302.

Once the fleet code is recorded in the master key, the operator removes the master key from the key reader and writer. The key is then taken to the vehicle where it is inserted in the ignition key switch (FIG. 2) of the vehicle (406). The vehicle reads the master key in the manner described above, determines that it is a master key by comparing numeric values and records a value indicative of the new fleet code in one of its memory devices (408).

The number indicating the fleet code that is stored in the vehicle need not be the same as the number indicating the fleet code that is stored in the master key, which also need not be the same as the number indicating the fleet code that is stored in the computer 302. Indeed it is preferable that they are not the same, but are encrypted or encoded in some manner to prevent easy copying and programming of a master key. It is preferred that they bear some predetermined relationship with each other, however.

Once the vehicle receives a new fleet code from computer 302, all the old operator's keys are disabled, for they do not have the new fleet code embedded within their communications circuit (410). If the control system of the vehicle determines that the fleet code it reads from an operator's key and the fleet code in the vehicle's memory circuit do not match, the control system of the vehicle will not permit the vehicle to be started. As a result, changing the fleet code of the vehicle disables all of the existing operator's keys for that vehicle and new ones are programmed as described below (410).

Figure 8:
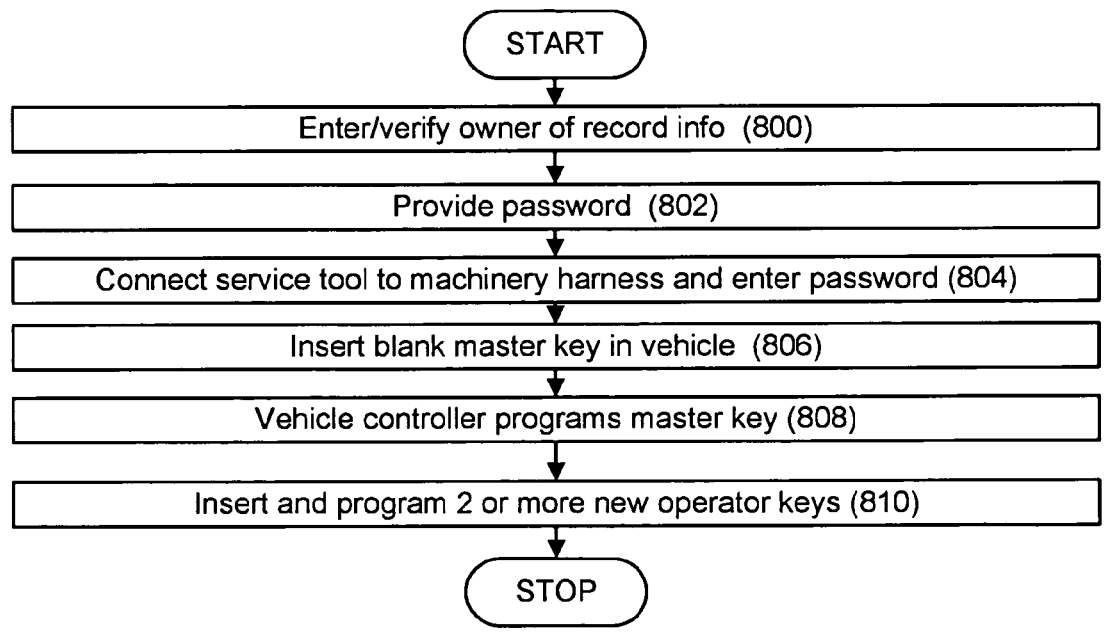
FIG. 8 is a flow chart illustrating the process of creating a new master key for a vehicle using a service tool coupled to the serial bus of the vehicle control system.

In the event the master key for a vehicle is lost or stolen, a replacement master key can be provided by the manufacturer or by a distributor or other agent of the manufacturer, as shown in FIG. 8. To begin the process, the manufacturer's agent contacts the manufacturer to determine the owner of record (800). The manufacturer provides the agent with a password to the vehicle (802). The agent travels to the vehicle, affirms that the vehicle is indeed the vehicle described as having lost the master key, couples a vehicle programming tool to the control system of the vehicle and enters the vehicle password (804). The vehicle programming tool is a preferably a portable PC that has a communication circuit that can be coupled to the serial communications network (the CAN bus) of the vehicle. Once connected to the CAN bus, it is configured to selectively communicate with any of the controllers on the CAN bus and reprogram them. In this case, it programs the vehicle to make a new master key. Once the programming tool is coupled to the CAN bus, the operator inserts a blank master key into the ignition switch lock of the vehicle (806). In response, electronic controller 208 programs the master key blank, recording in it all the vehicle characteristics that the master key later transfers to a computer described herein (808). The control network of the vehicle, once it has programmed a new master key, is configured to reject the old master key and the old operator's keys as well. It treats the old master key and the old operator's keys as it would a master key or operator key to another vehicle: they are not granted access.

Once the new master key is programmed, the operator can either continue by further programming one or more operator keys inserted in the vehicle's ignition switch lock (810), or the new operator keys can be programmed by the computer 302 once the vehicle is reenrolled in the access control system using its new master key.

In any case, having generated a new master key, the vehicle now identified by that key must be re-enrolled in the fleet by the access control workstation 300 (FIG. 4), since any existing operator key will no longer operate the vehicle.

As part of vehicle enrollment in the access control system, computer 302 stores a record of the vehicle and its characteristics in the RAM or ROM memory of computer 302. This record includes all of the characteristics of the vehicle that were stored in the master key and downloaded to computer 302 during enrollment. For each of these characteristics, the memory of computer 302 includes a corresponding textual string that is associated with each of the characteristics. These text strings express in verbal form the characteristics stored in the master key in numeric form.

Figure 5:
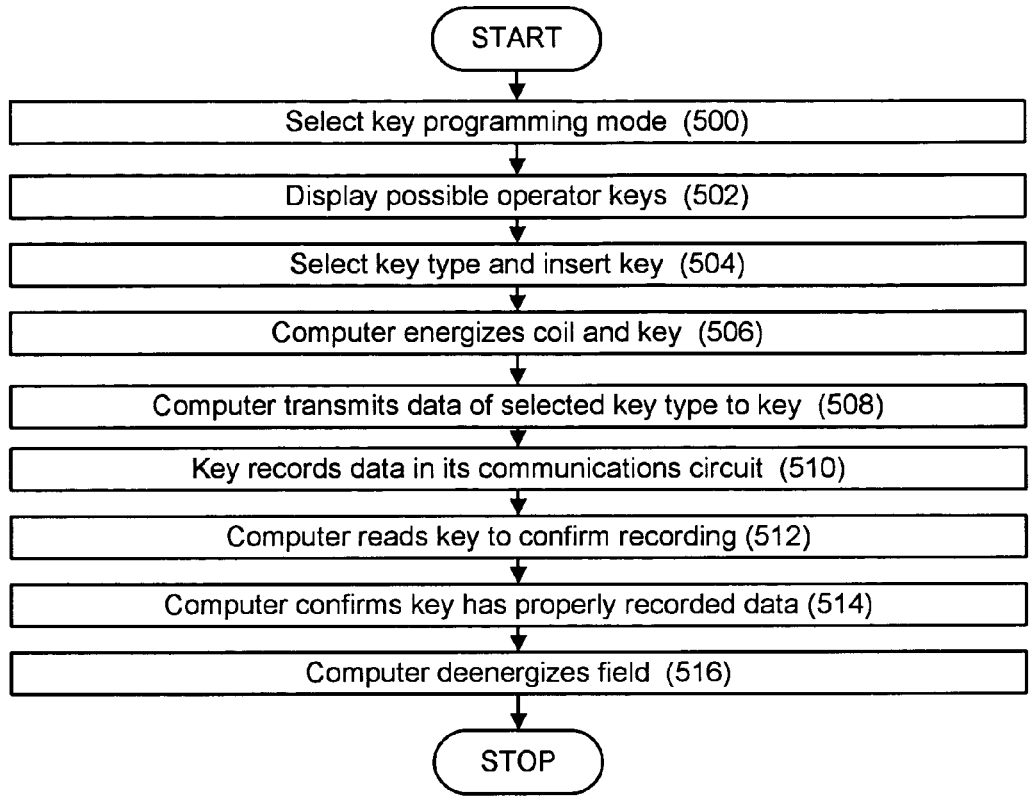
FIG. 5 is a flow chart of the process by which the access control workstation programs an operator key.

Once the vehicle has been enrolled in the fleet, computer 302 can program new operator's keys that will operate the newly enrolled vehicle. This process is illustrated in FIG. 5.

First, the operator selects the key programming mode of computer 302 using the display, keyboard and mouse of the computer (500). Once in the key-programming mode, the computer 302 is configured to present the operator of the computer 302 with a choice of the different types of operator keys that can be made, such as keys for any individual vehicle, keys for any defined sub-fleets or keys for the entire fleet (502). The operator selects from among the choices and inserts the key into key reader and writer 312 (504).

Computer 302 energizes the coil, which generates an electromagnetic field. The field, in turn, energizes the key (506). Computer 302 then transmits numeric data to the key that is indicative of the desired vehicle, sub-fleet, or fleet the key is granted permission to operate (508). The key records the data it receives from the coil in its communications circuit (510). The workstation then queries the key to insure the proper data has been recorded (512). Once it has made this confirmation (514), the computer 302 deenergizes the coil 314 of key reader and writer 312 (516). At this point, the operator can remove the key and insert a new key to be programmed if desired.

To create a sub-fleet, vehicles must first be selected for that sub-fleet.

First, each individual vehicle in the sub-fleet may be selected and added to a list of sub-fleet members in computer 302. In this case, the sub-fleet will not automatically increase when new vehicles are enrolled in the fleet. As an example, sub-fleet 138 of FIG. 1 is a closed sub-fleet. It is maintained in the memory of computer 302 (and in key 116) as a collection of individual vehicle identification numbers. Since vehicle identification numbers are unique, any newly enrolled vehicle will not have the same identification number as the identification numbers stored in computer 302 and key 116 and therefore no newly enrolled vehicles will be accessible to key 116 until it is brought in for reprogramming.

The second type of sub-fleet is an open sub-fleet—a sub-fleet in which the vehicles are not selected as individual vehicles (and therefore recorded in the key as individual vehicle identification numbers) but are selected by vehicle characteristics common to one or more vehicles in the sub-fleet. These sub-fleets are created and enlarged automatically whenever a new vehicle is enrolled. As an example, a newly enrolled skid-steer loader increases the skid-steer loader sub-fleet by one. And whenever new vehicles having the identified characteristics (vehicle type, size, horsepower, model number, etc.) of the sub-fleet are enrolled in the fleet, current holders of keys giving access to vehicles with those characteristics automatically get access to the newly enrolled vehicles without the need to reprogram the keys.

Referring back to FIG. 1, fleet 100, sub-fleet 122, sub-fleet 128, and sub-fleet 130 are of the second type. They are open to new members without reprogramming their associated operator keys. Fleet 100 is defined by the fleet code. This fleet code is stored in each vehicle when it is enrolled. When an operator's key, previously programmed with that fleet code, is inserted into the ignition switch of a newly enrolled vehicle, the newly enrolled vehicle (which was programmed with the fleet code during enrollment) will respond by comparing its fleet code with the fleet code of the key and permitting the key to operate the vehicle.

Figure 6:
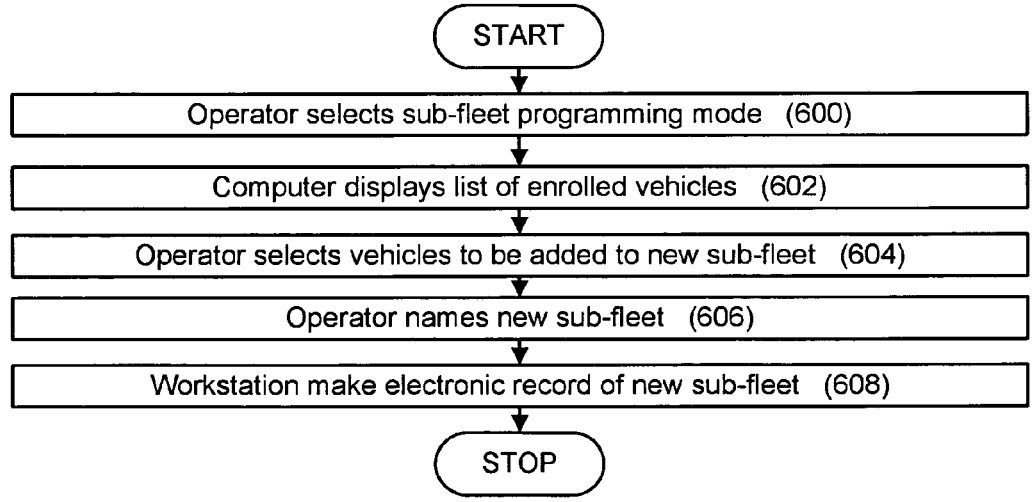
FIG. 6 is a flow chart illustrating the process of creating new sub-fleets.

The process of creating or adding to a closed sub-fleet is illustrated in FIG. 6. To create a sub-fleet, the operator first selects the sub-fleet programming mode at computer 302 (600). In this mode of operation, computer 302 lists all the vehicles in the fleet by their vehicle identification numbers on display 304, and it lists all the physical or other characteristics by which vehicles are identified (602). To create an open sub-fleet, the operator selects characteristics (model, type, horsepower, etc.) from the list of characteristics. To create a closed sub-fleet, the operator selects vehicles from the set of vehicle identification numbers.

More than one characteristic can be used to create a sub-fleet. Computer 302 is configured to let the operator select several characteristics and logically combine them with Boolean AND or OR operators using the keyboard or pointer.

If, for example, two characteristics are selected by the operator who "OR's" them together, all vehicles that have either the first characteristic OR the second characteristic will be included in the sub-fleet that is created. For example, the operator might select "wheel loaders" as one characteristic "OR" "skid-steer loaders". If so, any key created for this sub-fleet will operate on wheel loaders and skid-steer loaders.

As another example, if the operator selected "loader-backhoes" as one characteristic, AND with the "40 Horsepower" characteristic, only vehicles that have both 40 horsepower and were wheel loaders will be included in the sub-fleet so created. Any key created for this sub-fleet will only operate wheel loaders having 40 horsepower.

Computer 302 is configured to combine more than two characteristics using the Boolean operators if the operator so selects and connects them.

Individual vehicles can be added to a sub-fleet in addition to the characteristic or characteristics selected by using the keyboard and the mouse to select each individual vehicle to be added to the closed sub-fleet from the individual vehicle list on display screen 304. Alternatively, selecting vehicles by vehicle identification number and not by vehicle characteristics can create a pure, closed sub-fleet. See for example, sub-fleet 138 (FIG. 1).

When the operator is finished selecting vehicles and characteristics of the sub-fleet, he then signals the computer that he is finished, and the computer responds by displaying a text box on display 304 in which the operator then enters the name of the sub-fleet (606). Once the sub-fleet is so created and named, computer 302 saves a record of the sub-fleet in its database of sub-fleets (608).

Having enrolled vehicles and created one or more sub-fleets, the operator may now program individual operator keys to operate vehicles in those sub-fleets. It is not essential that sub-fleets of more than one vehicle be created before the operator programs operator keys, since operator keys may be programmed for individual vehicles.

Figure 9:
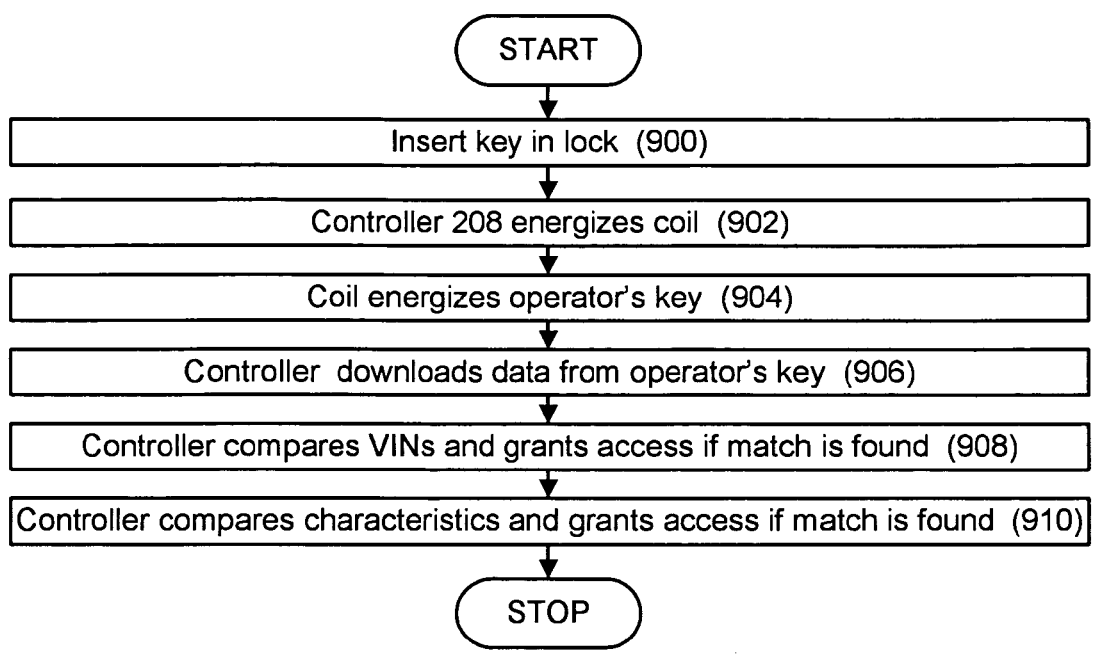
FIG. 9 is a flow chart illustrating the process of accessing a vehicle using an operator key according to the present invention.

To this point, we have explained how vehicles are enrolled in the access control system, how sub-fleets are created, how new master keys are created and how individual keys may be inspected and identified. The final piece is explaining how the key interacts with the vehicle to access and operate the vehicle. This process is illustrated in FIG. 9.

First, the operator inserts the operator's key into the ignition switch lock and rotates it (900). Since all operator's key have the same shape to their mechanical lock-engaging parts, the operator's key can be inserted into, rotate in and turn on all the ignition switch locks of all the vehicles in the fleet.

When the key is inserted, controller 208 activates coil 226 (902). The coil, in turn, energizes the communication circuit 120 of the operator's key (904). Once energized, controller 208 communicates with the operator's key, receiving the electronic data stored in communications circuit 120 such as any vehicle identification numbers and characteristics stored therein (906). This data identifies the vehicles that the key (and hence the operator) is permitted to use. The data transmitted by the key was previously programmed into the key by the process shown in FIG. 8.

Having received the key data, controller 208 compares the vehicle's identification number with the downloaded identification numbers (908). If there is a match, controller 208 signals the other controllers to respond to the operator controls and give the operator access to the vehicle. If the signals do not match, controller 208 does not give access. The controller then compares the characteristics downloaded from the operator's key with the characteristics of the vehicle electronically stored in controller 208 (910). If the vehicle's characteristics match the characteristics downloaded from the key, controller 208 signals the other controllers to respond to the operator controls and give the operator access to the vehicle. If not controller 268 does not give access.

It can be seen that an access control system has been disclosed that permits central management of vehicle operator's keys and vehicles. The embodiments described herein should not be deemed as limiting, however, and are intended only as illustrations of the invention which is defined in the claims. Other arrangements and embodiments that fall within the scope of the claims are also considered to be inventions.

| | |
|---|---|
| Fleet | 100 |
| First border | 102 |
| Operator key | 104 |
| Lead line | 106 |
| | 108 |
| key | 110 |
| key | 112 |
| key | 114 |
| key | 116 |
| key | 118 |
| communication circuit. | 120 |
| loader-backhoe sub-fleet | 122 |
| second border | 124 |
| lead line | 126 |
| second sub-fleet | 128 |
| third sub-fleet | 130 |
| two skid steer loaders | 132, 134 |
| third skid steer loader | 136 |
| fourth sub-fleet | 138 |
| loader backhoe | 140 |
| vehicle control network | 200 |
| digital electronic controllers | 202, 204, 206, 208 |
| transmission controller | 202 |
| auxiliary. hydraulics controller | 204 |
| engine controller | 206 |
| controller | 208 |
| | 210 |
| CPU | 212 |
| RAM | 214 |
| ROM | 216 |
| Signal conditioning and driving circuit | 218 |
| Communications circuit | 200 |
| High-speed computer bus | 222, preferably a serial bus or CAN bus |
| Ignition switch | 224 |
| Coil | 226 |
| Access control workstation | 300 |
| Computer | 302 |
| Computer visual display | 304 |
| Keyboard | 306 |
| Mouse | 308 |
| Disk drive | 310 |
| Key reader and writer | 312 |
| Coil | 314 |

We claim:

1. An access control system for a fleet of vehicles comprising:
   a plurality of vehicle keys having an embedded communication circuit, each communication circuit being programmable for a vehicle operator;
   an access control workstation including a central computer having means for inputting information to the central computer and means for outputting information from the central computer; and
   a read and write mechanism coupled to the central computer, wherein the central computer is operable to electronically communicate with the embedded communication circuit of each of the plurality of vehicle keys and to program each of a plurality of operator's keys with at least a first digital signal, and further wherein the central computer is operable to enable at least two of the plurality of operator's keys to gain access to an operating system of at least one work vehicle of the fleet of vehicles, wherein the workstation is operable to electronically receive and record digital data indicative of characteristics of the at least one work vehicle from a first vehicle master key, and to subsequently enroll the at least one work vehicle into the fleet.

2. The access control system of claim 1, wherein all of the plurality of vehicle keys includes a mechanical key portion, and further wherein the at least one work vehicle includes a digital electronic controller and a key switch coupled thereto, wherein the key switch includes locking elements operable by the mechanical key portion of all of the plurality of vehicle keys, and further wherein the digital electronic controller is operable to communicate with the communications circuit of the plurality of operator keys to receive the first digital signal.

3. The access control system of claim 2, wherein the mechanical key portion of all of the plurality of vehicle keys is an elongate member, wherein the key switch includes a plurality of moveable lock elements moveable to unlock the key switch, and further wherein the elongate member has a plurality of recesses oriented to couple with the plurality of moveable lock elements of the key switch to unlock the switch.

4. The access control system of claim 1, wherein the workstation is operable to program at least one vehicle key of the plurality of vehicle keys to provide access to each of a plurality of sub-fleets of the fleet of vehicles enrolled in the access control system.

5. A method of operating an access control system for a fleet of work vehicles, the access system having an access control workstation including a central computer and a key reader and writer coupled to the computer and operable to read digital data from and write digital data to a communications circuit of a key, the method comprising the steps of:
electronically coupling a first key to the key reader and writer, the first key including characteristics of a first work vehicle stored in digital form;
electronically transmitting the characteristics of the first work vehicle from the first key to the central computer; and
enrolling the first work vehicle in the fleet.

6. The method of claim 5, wherein the step of enrolling the first work vehicle in the fleet includes the step of making a first electronic record of the first work vehicle in the central computer, the first electronic record enabling the workstation to include the first work vehicle in at least one sub-fleet.

7. The method of claim 6, wherein receipt of the first electronic record of the first work vehicle enables the workstation to program a first vehicle key to operate the first work vehicle.

8. The method of claim 7, further comprising the steps of:
electronically coupling a second key to the key reader and writer, the second key including characteristics of a second work vehicle stored in digital form;
electronically transmitting the characteristics of the second work vehicle from the second key to the central computer; and
enrolling the second work vehicle in the fleet.

9. The method of claim 8, wherein the step of enrolling the second work vehicle in the fleet includes the step of making a second electronic record of the second work vehicle in the central computer, the second electronic record enabling the workstation to include the second work vehicle in at least one sub-fleet.

10. The method of claim 9, wherein the electronic record of the second work vehicle enables the workstation to program a second vehicle key to operate the second work vehicle.

11. The method of claim 5, further comprising the step of electronically reconfiguring the first work vehicle to respond to vehicle keys programmed by the workstation.

12. The method of claim 11, wherein the first work vehicle includes a first digital electronic controller configured to electronically communicate with vehicle operator's keys, and further wherein the step of electronically reconfiguring the first work vehicle includes the steps of:
transmitting a digital signal from the central computer to the first key after the step of enrolling the first work vehicle, the digital signal representing the identity of the fleet;
storing the digital signal in the first key;
transporting the first key to the first work vehicle;
electronically coupling the first key to the first digital electronic controller to transmit the digital signal from the first key to the first digital electronic controller; and
storing the first digital signal in the first digital electronic controller.

13. The method of claim 12 further comprising the steps of:
using the workstation to program a first operator's key to operate the first work vehicle, the programming including at least the step of transmitting a second digital signal to the first operator's key and storing the second digital signal therein;
carrying the programmed first operator's key to the vehicle and electronically coupling the programmed first operator's key to the first digital electronic controller; and
transmitting the second digital signal to the first digital electronic controller.

14. The method of claim 13, further comprising the steps of:
comparing the first digital signal with the second digital signal in the first work vehicle; and
electronically enabling access to the first work vehicle by the first operator's key at least in response to the results of the step of comparing.

15. The method of claim 5, wherein the characteristics of the first work vehicle stored in the first key include at least one of the following: a vehicle model identifier, a vehicle horsepower, a vehicle type, and a unique vehicle identification number.

* * * * *